Oct. 25, 1960   A. H. RICH   2,957,701
TORSION SUSPENSION SYSTEM FOR VEHICLES
Filed Nov. 8, 1957   3 Sheets-Sheet 1

INVENTOR
ALAN H. RICH

BY

ATTORNEYS

Oct. 25, 1960
A. H. RICH
2,957,701
TORSION SUSPENSION SYSTEM FOR VEHICLES
Filed Nov. 8, 1957
3 Sheets-Sheet 2
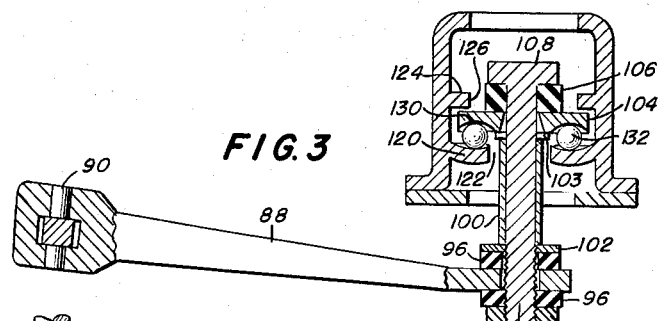
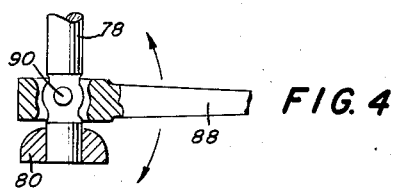
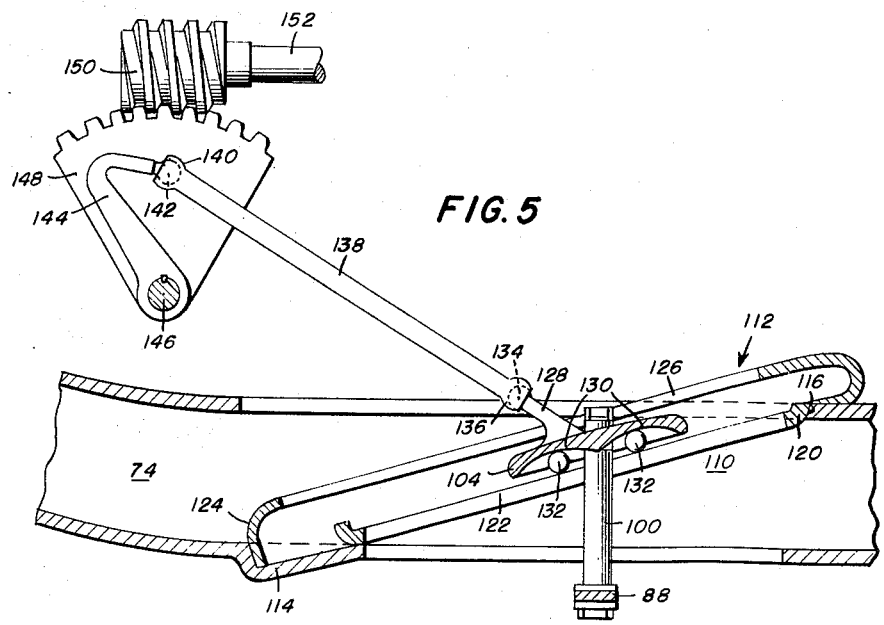
INVENTOR
*ALAN H. RICH*
BY *Leech & Radue*
ATTORNEYS

INVENTOR
ALAN H. RICH

United States Patent Office 2,957,701
Patented Oct. 25, 1960

2,957,701

TORSION SUSPENSION SYSTEM FOR VEHICLES

Alan H. Rich, 4519 Alabama Ave. SE., Washington, D.C.

Filed Nov. 8, 1957, Ser. No. 695,444

3 Claims. (Cl. 280—104)

This invention relates to suspension systems for vehicles and more particularly to interconnected torsion spring suspension arrangements for motor vehicles.

One of the principal objects of this invention is to provide a vehicle with a torsion spring suspension system which will greatly improve the riding characteristics while also making the vehicle easier to handle and safer on uneven terrain.

Another object is to provide a vehicle with springing systems common to front and rear wheels on each side which act to null out pitching forces, and frame-racking forces, to better distribute side-loads on the front and rear tires for better traction, and to resist body roll and sway.

Still another object is to stabilize these pitch-nulling systems by relocating the vehicle's axis of pitch in order that the vehicle's own weight rather than spring forces will tend to maintain a level pitch attitude.

It is also an object of this invention to prevent excessive rotation or rotary oscillation of the rear axle housing which reduces traction, and causes pitch when accelerating, through the use of radius rod-traction bar systems or swing-axle or parallel-arm type rear wheel suspensions.

It is yet another object to provide a suspension system which includes a stabilizing system having variable-rate spring action on each wheel which increases the spring-rate upon elevation of that wheel to prevent bottoming.

This invention will appear more clearly from the following detailed description when taken in conjunction with the accompanying drawings, showing by way of example, two embodiments and wherein:

Fig. 3 is a cross sectional view taken along line 3—3 of Fig. 1 looking toward the forward end of the vehicle and shows the details of both end connections of the rear torque arm;

Fig. 4 is a top plan view, partly in section, of a portion of Fig. 3 showing the mounting of the torque arm on the torsion rod;

Fig. 5 is an elevational view showing the details of the variable-rate mechanism associated with the torsion spring;

The embodiment illustrated in Figs. 1–5 includes an automobile chassis and running gear structure in which the body and other unessential associated structure has been omitted for the sake of simplicity in depicting this invention. The vehicle illustrated is of the conventional type in which the front wheels 20 are supported for vertical movement by independent axle assemblies of the type utilizing upper and lower swinging control arms 22 and 24 respectively.

In this particular vehicle the rear wheels 30 are connected by an axle housing 32 although they may be mounted for independent suspension in the same general manner as the front wheels.

Figure 1:
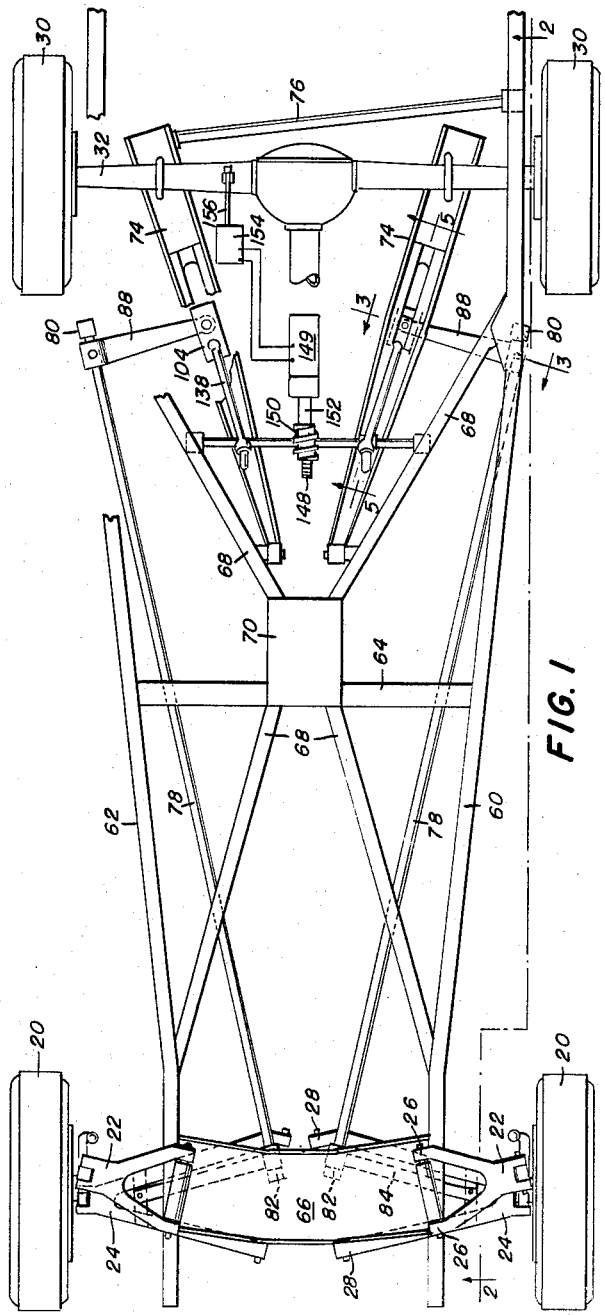
Fig. 1 is a top plan view of one embodiment, showing a vehicle frame, the wheel mountings and one embodiment of the torsion spring system of this invention.
Figure 2:
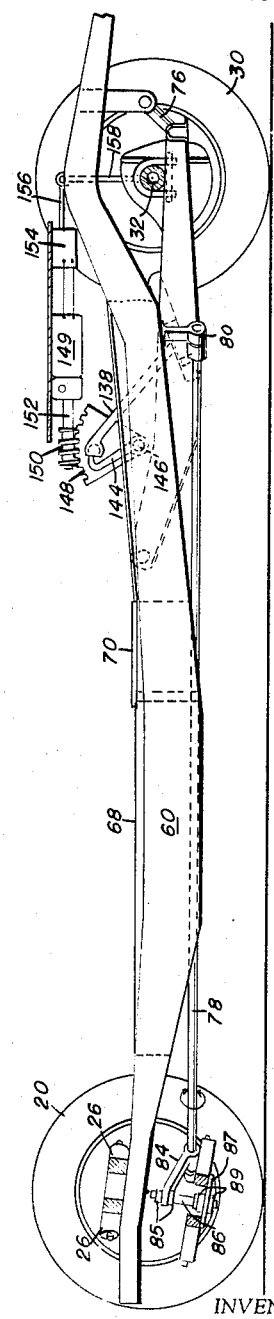
Fig. 2 is a side elevational view taken along line 2—2 of Fig. 1.
Figure 8:
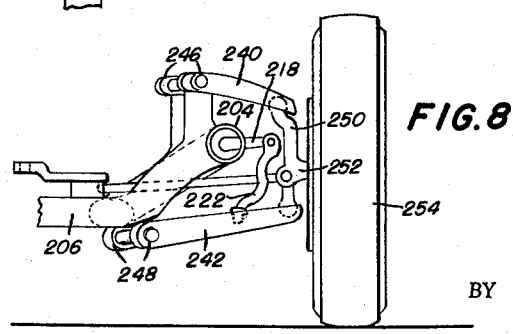
Fig. 8 is an end elevational view looking rearwardly and showing the mounting of one of the front wheels.

As shown in Figs. 1 and 2 the bifurcated ends of upper and lower control arms 22 and 24 are pivotally mounted at 26—26 and 28—28 respectively and the outer ends are connected to a conventional king pin and axle arrangement for mounting the wheel 20. An example of this type of mounting is shown in Fig. 8 wherein upper and lower control arms 240 and 242 have their bifurcated ends journalled on the front cross frame member 206 at points 246—246 and 248—248 respectively. The outer ends of the upper and lower control arms are suitably connected to king pin 250 having a stub axle 252 extending therefrom to carry wheel 254.

Referring to Figs. 1 and 2 the vehicle frame comprises longitudinal side frame members 60 and 62 held in spaced relation by means of mid-cross piece 64, forward cross frame member 66 and diagonal braces 68 which converge inwardly and are secured to plate 70.

The rear wheels 30 are carried on axle housing 32 supported by angularly disposed rear suspension arms 74—74 which are pivotally mounted on the rear diagonal frame member 68. An anti-sway bar 76 is secured to frame member 60 and the opposite rear suspension arm 74.

Torsion rods 78 are longitudinally disposed and supported by bearing units 80 secured to the side frame members at the rearward portion of the frame and by bearing units 82 extending from the front cross member 66. Front torque arms 84 are secured to the forward end of the torsion rods for rotation therewith. The outer end of each forward torque arm is flexibly connected to pin 86 which is similarly secured to the lower control arm 24. As best shown in Fig. 2 one end of pin 86 extends through a hole in the outer end of front torque arm 84 and is flexibly supported by resilient bushings 85—85 while the other end of pin 86 passes through a hole in bracket 87 which is secured to the lower control arm 24. The pin is held in bracket 87 between resilient bushings 89—89.

As best shown in Figs. 1, 3, and 4 the rear torque arm 88 is secured to torsion rod 78 by means of a pin 90 which extends vertically through the rod at right angle to the longitudinal axis of the torsion rod. This makes it possible for the torsion rod to positively rotate the torque arm about the longitudinal axis of the rod and yet allow the torque arm to swivel about the pin axis as indicated by the arrows in Fig. 4.

The inner end of torque arm 88 is flexibly secured to bolt 92 as indicated in Fig. 3 wherein said bolt has a threaded lower end fitting through a hole 94 in the inner end of the arm 88. The bolt is flexibly held by resilient bushings 96—96 on each side of the torque arm and is secured by a nut 98. A sleeve 100 fits over and surrounds the mid-portion of the bolt, the lower end of the sleeve bearing against washer 102 and the upper end check-stopping against the washer 103 on the underside of the connecting rod head 104 through which the bolt passes. The connecting rod head 104 is flexibly fastened to the bolt 92 by resilient bushing 106 held down against the upper face of the connecting rod head 104 by bolt head 108 and check-stopping on the lower face of the head by sleeve 100 through washer 103.

The rear susepnsion arm 74 is box-shaped in cross section and has a cut out portion forming a vertical opening 110 in the arm. A track assembly 112 is positioned in the opening with its forward end held in an offset portion 114 in the forward lower face of the arm 74 and the rear end in position abutting the upper face 116 of the arm 74. The track assembly 112 comprises lower track member 120 having a longitudinal slot 122 of sufficient width to allow sliding movement of bolt 92 which extends therethrough. The upper track member 124 has a longitudinal slot 126 which is sufficiently wide to accommodate the head 108 of bolt 92 as well as the projection 128 extending upwardly from the upper face of the connecting rod head 104.

The connecting rod head 104 is slidably carried in the track assembly 112 on a rolling ball arrangement. As illustrated in Figs. 3 and 5 the connecting rod head 104 is generally rectangular in shape and has a pair of meeting concave portions on its lower face which extend longitudinally of the head. These portions are also slightly concave transversely to form a dished-out section 130 adapted to retain a ball 132. The dished-out sections 130 act as the upper housing element for the balls 132 and the lower track member which is transversely slightly concave serves as the lower supporting member. There is a slight clearance between the lower face of the upper track member 124 and the upper face of the connecting rod head 104 so as to make certain that the head cannot be lifted enough to free the balls 132 held on the underside of the head.

The projection 128 has a ball member 134 on its extremity which interfits with connecting socket 136 of connecting rod 138. The rod 138 has a socket 140 on its upper end which interfits with ball 142 on crank 144. This crank 144 is keyed to shaft 146 to which gear section 148 is also secured. The toothed portion of gear 148 meshes with worm gear 150 carried on shaft 152 extending from and rotated by electric motor 149. The electric motor is controlled by a delayed action switch 154 actuated by link 156 fastened to lever 158 secured to the axle housing 32.

In operation, upon a load being placed upon the vehicle frame the weight is transferred from the frame to the wheels through the longitudinal torsion rods to the torque arms on the front to the lower control arm and through to the wheel and, on the rear, to the torque arms, the rear suspension arms and axle housing carrying the rear wheels. As the weight is increased on the rear of the vehicle, the weight compensating unit comprising lever 158, switch link 156, switch 154, motor 149, shaft 152, worm 150, gear 148, crank 144, connecting rod 138 and connecting rod head 104 riding in track assembly 112 is brought into action. Lever 158 pivots switch link 156 to actuate the motor 149 rotating shaft 152 together with worm 150 carried thereon. Worm 150 turns gear section 148 thus turning crank 142 which through connecting rod 138 causes the head 104 to travel upwardly over the track member 120 toward the rear of the vehicle. Thus the distance from the pivot point of the rear suspension arm 74 to the head 104 is increased thereby changing the mechanical advantage of the front suspension over the rear and thus resulting in an increase of the downward force on the rear suspension arm and hence a reaction causing the vehicle frame to be raised slightly at the rear. Conversely forward movement of the head 104 due to decrease in load will result in lowering of the rear of the vehicle.

The track assembly 112 on the rear suspension arm slopes downwardly toward the front relative to the suspension arm at an angle slightly greater than that at which the suspension arm slopes downwardly toward the rear relative to the frame when in equilibrium pitch position. This slightly over corrects for the non-parallelism of the suspension arm 74 and the plane of the torque arm swinging about its axis. The additional slope supplements the under-compensation providing for overall body sink by the unwinding of the torsion bar when torque is reduced by the travel of the head 104 rearwards on the track assembly 112 on each rear suspension arm 74.

After the initial compensation for weight load has been made as previously described the vehicle will be in a level position ready for travel. The variations in the attitude of the vehicle during travel over uneven terrain after the initial compensation may be corrected in numerous ways. One way to accomplish this is to fix the torque arms at each end of each torsion rod at a positive dihedral angle so that in equilibrium position the torque arms extend upwards whereby the included angle over-the-top of the torsion rods between the front and rear torque arms is less than 180°. As either the front or rear wheel on one side of the vehicle is elevated relative to the other on that side, the pitch axis of the vehicle is lifted against gravity thus tending to restore equilibrium. Pitch axis is defined as the lateral axis through the vehicle about which the front and rear ends of the body may be said to rotate or pitch. This action has a rate which increases with the displacement of any wheel from equilibrium. If the torque arms are short enough, bottoming is prevented by the rate approaching infinity as the torque arms approach the top-dead-center position relative to the torsion rods.

As best shown in Fig. 5, the forward end of the connecting rod 138 is held fixed by crank 144 after the initial adjustment by the weight compensating unit. Consequently, as the rear suspension arm 74 swings upwardly about its pivot point the connecting rod head 104 will be forced to slide rearwardly and upwardly on the track assembly 112. Obviously, on downward movement of the suspension arm 74 the connecting rod head 104 will slide forwardly and downwardly. The varying of the distance of the head 104 from the pivot point of the suspension arm 74 by the movement of the head up, back and forth on the track assembly 112 produces an increasing or decreasing torque depending on whether the head is rearward or forward on the track assembly. The forward and rearward motion of the head 104 responds more quickly when the rear wheels are in a lowered position due to the fact that the point at which the connecting rod 138 is secured to the crank 144 is above the pivot point of the suspension arm 74.

The rate of stabilizing action is increased by lengthening the proportionate excursion of the head 104 on the track assembly 112 thereby providing a wider variation of mechanical advantage of rear over front suspension. The shorter the travel of the head the smaller the equilibrium-restoring forces will be.

The rate may be further varied by curving the underside face 130 of head 104 so that the head and hence the vehicle is lifted more at the end of the travel of the head than at some mid-point of travel.

Referring to the embodiment illustrated in Figs. 6–9, it is in many respects similar to the first embodiment shown in Figs. 1–5.

Figure 6:
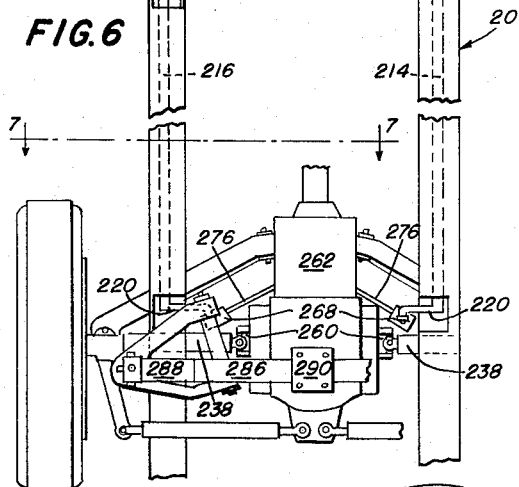
Fig. 6 is a top plan view of a second embodiment of this invention.
Figure 9:
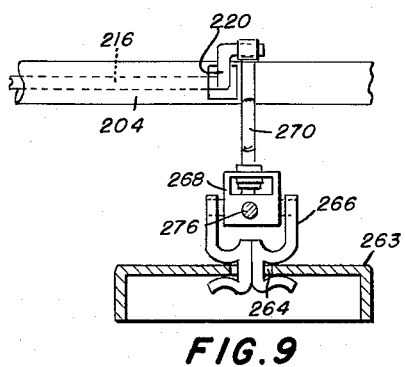
Fig. 9 is a vertical cross sectional view taken along line 9—9 of Fig. 7 showing the manner in which the head member is slidably mounted in the lower control arm.

As shown in Fig. 6 the frame 200 includes parallel tubular side members 202 and 204 and connecting cross member 206 braced with short diagonals 208 and 210. Cross members such as 280 connect the tubular side members 202 and 204.

In this embodiment both the front and rear wheels are supported for independent suspension in a conventional system employing upper and lower swinging control arms. As best indicated in Fig. 8, the front wheel 254 is carried by an assembly comprising upper and lower arms 240 and 242 having their bifurcated ends journalled on the front cross frame member 206 at points 246—246 and 248—248 respectively. The outer ends of the upper and lower arms 240 and 242 are suitably connected to king pin 250 having a stub axle 252 extending therefrom to carry the wheel 254.

Torsion rods 214 and 216 are rotatably mounted within side members 202 and 204 respectively as indicated in Fig. 6. Each end of rod 216 is bent to form a torque arm 218 at the front end and a torque arm 220 at the rear end. As illustrated in Fig. 8 torque arm 218 is secured to torque link 222 which is in turn fastened to the lower control arm 242.

Figure 7:
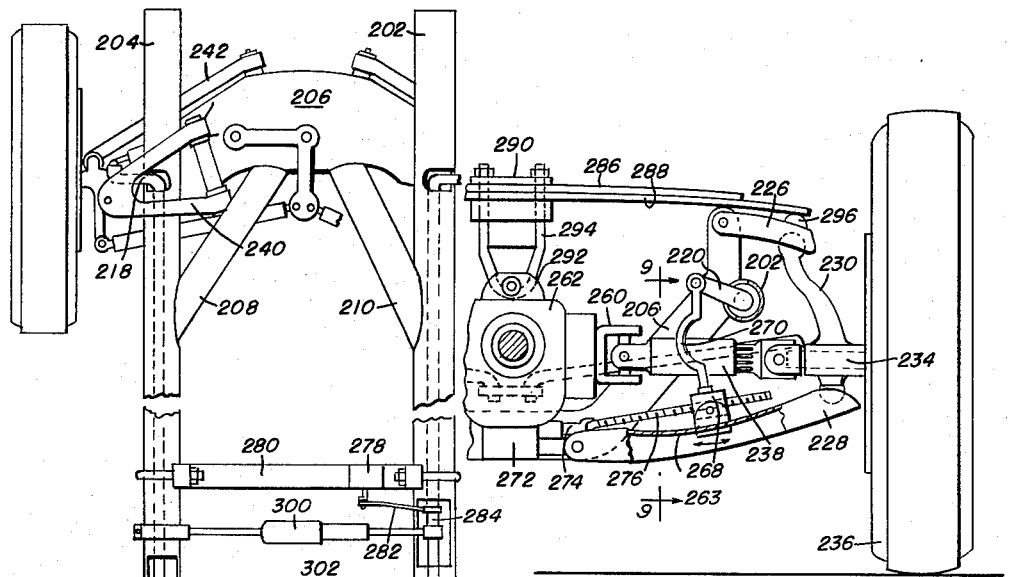
Fig. 7 is an elevational view taken along line 7—7 of Fig. 6 looking toward the rear of the vehicle.

Referring to Fig. 7 which shows the rear suspension on one side of the vehicle, the system includes upper and lower control arms 226 and 228 respectively, having bifurcated ends journalled on frame cross member 206. The outer ends of the upper and lower control arms are connected to a kingpin 230 having a bearing through which extends axle 234 carrying wheel 236. The outer end of axle 234 is connected by a splined assembly 238 to a universal joint 260 carrying power from the transmission and differential assembly 262.

The lower control arm 228 has a flat plate-like portion 263 having a slot 264 which runs generally perpendicular to the fore and aft direction of the vehicle. This slot slidably receives a head member 266 which in turn pivotally carries block 268. This block is flexibly connected to connecting rod 270 which is in turn flexibly attached to torque arm 220.

As shown in Fig. 7, levelizing electric motor 272 rotates shaft 274 which is connected to threaded rod 276 threadedly fitting in block 268. The levelizing motor 272 is controlled by a switch 278 mounted on a cross member 280 between frame side members 202 and 204. The switch 278 is connected through linkage 282 to a crank portion 284 of torsion rod 214.

As best illustrated in Figs. 6 and 7 an auxiliary spring assembly is mounted for engagement with the rear suspension system. A pair of leaf springs 286, 288 are fastened to a plate assembly 290 supported by a pair of U-shaped bolts 294—294 pivotally mounted on a bracket and pin assembly 292 on differential 262. The outer end of spring 288 bears on a cushion element 296 mounted on the outer upper end portion of upper control arm 226.

Referring to Fig. 6 a double-action shock absorber 300 is connected on one end to crank 284 of torsion rod 214 and on the other end to frame side member 204. Shock absorber 302 is connected to frame side member 202 and crank 304 of torsion rod 216.

The levelizer arrangement in this second embodiment operates in the same general manner as that of the first embodiment. The level position of the vehicle is maintained under static conditions by actuation of the levelizer switch 278 under action from torsion rod 214 causing motor 272 to operate and rotate threaded rod 276 to slidably move head 266 along plate 263 on the lower control arm 228. The lower end of both connecting rods 270 are moved outwards on the lower control arms 228 to compensate for heavier rear end loads and the ends of the rods 270 are moved inward to decrease the mechanical advantage of the rear torque arms 220.

The respective front and rear torque arms of each torsion rod define an upward included angle of considerably less than 180° so that upward motion of wheel suspensions are limited by over-the-center action of the torque arm-to-suspension system and are controlled at an increasing rate by the resulting elevation of the vehicle as it pitches.

In order that the rear spring systems will anticipate low-frequency irregularities already encountered by the front wheels, the pitch axis is maintained in front of the center of gravity of the vehicle under static conditions by the auxiliary spring assembly comprising leaf springs 286 and 288. This spring assembly acts against the torsion rods, thus depressing the rear wheels and lifting the front wheels.

Except for the details outlined previously, the operation of the second embodiment is otherwise identical with that of the first embodiment.

The two embodiments described above are obviously only illustrative of two arrangements for practicing this invention, and it is not intended that they should in anyway limit the scope of the invention as set forth in the following claims.

What I claim as novel and desire to secure by Letters Patent of the United States is:

1. In a spring suspension system for a vehicle having a frame and front and rear wheels at the sides thereof, front and rear swinging arm means pivotally connected to the frame and to said wheels, a torsion rod supported between the rear and front wheels on each side of the frame, a torque arm extending from each torsion rod adjacent the end thereof, linkage means connecting each front torque arm to each front swinging arm means, a head member secured to the swinging end of the rear torque arm, a trackway in each rear swinging arm means, said trackway being inclined downwardly toward the front of the vehicle, said head being slidably mounted on the trackway whereby the head member may slide black and forth along the rear swinging arm means to vary the distance between the head and the pivot point of the rear swinging arm means thus varying the torque exerted on the rear swinging arm means by the torsion rod through the rear torque arm.

2. In a spring suspension system for a vehicle having a frame and front and rear wheels at the sides thereof, front and rear swinging arm means pivotally connected to the frame and to said wheels, a torsion rod supported between the rear and front wheels on each side of the frame, a torque arm extending from each torsion rod at each end thereof, a torque link connecting each front torque arm to each front swinging arm means, a head member secured to each rear torque arm, a trackway in each rear swinging arm means, said trackway being inclined downwardly toward the front of the vehicle, said head being slidably mounted on the trackway, switch operating means extending from one of the torsion rods, a switch mechanism actuated by said switch operating means, a motor controlled by said switch, means connected to the motor for reciprocating the head member along the trackway to vary the distance between the pivot point of the rear swinging arm means and the head member thus varying the torque exerted on the rear swinging arm means by the torsion rod through the rear torque arm relative to that exerted on the front swinging arm means.

3. The invention as described in claim 2 wherein the head member has a downwardly directed concave bottom face with ball bearings interposed between said face and the trackway to further vary the rate of stabilization action as the head member slides back and forth on the trackway.

References Cited in the file of this patent

UNITED STATES PATENTS 2,607,611  Allison _____ Aug. 19, 1952

FOREIGN PATENTS 1,122,404  France _____ May 22, 1956